Figure 1:
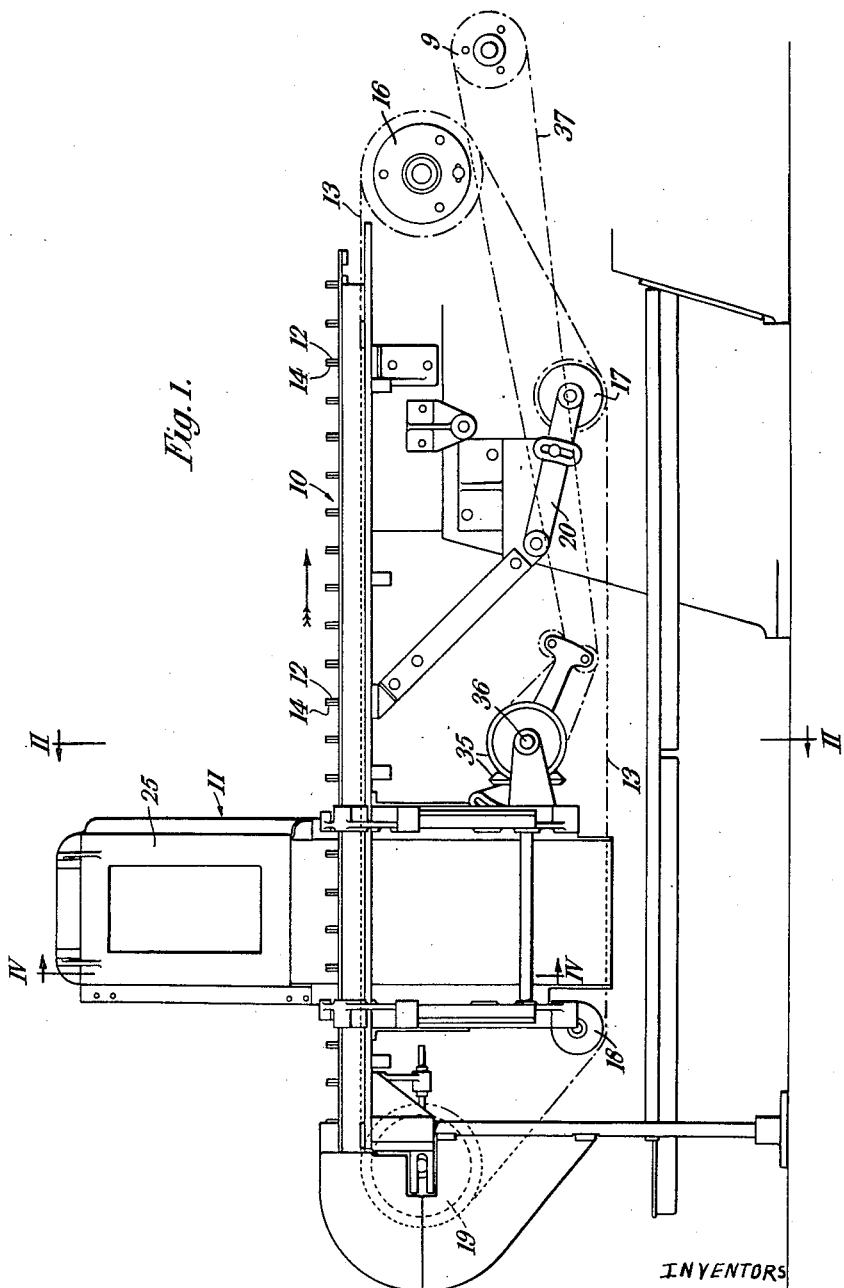

July 13, 1954

A. HOPTON ET AL 2,683,520

BISCUIT FEEDER

Filed May 19, 1952

6 Sheets-Sheet 1

INVENTORS
Alan Hopton
Alexander Russell
By Watson, Cole, Grindle & Watson
ATTORNEYS

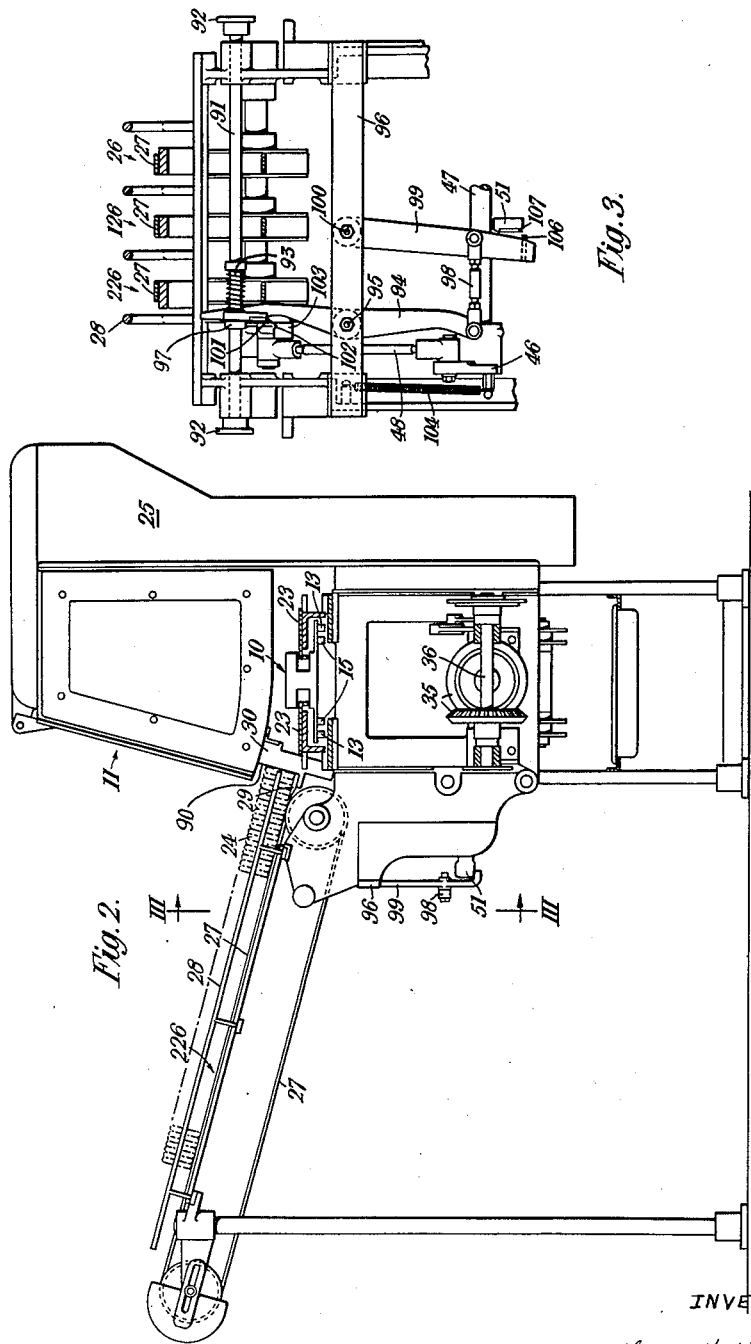

July 13, 1954

A. HOPTON ET AL 2,683,520

BISCUIT FEEDER

Filed May 19, 1952

6 Sheets-Sheet 3

INVENTORS
Alan Hopton
Alexander Russell
By Watson, Cole, Grindle
& Watson
ATTORNEYS July 13, 1954

A. HOPTON ET AL 2,683,520

BISCUIT FEEDER

Filed May 19, 1952

6 Sheets-Sheet 5

INVENTORS
Alan Hopton
Alexander Russell
By Watson, Cole, Grindle & Watson
ATTORNEYS.

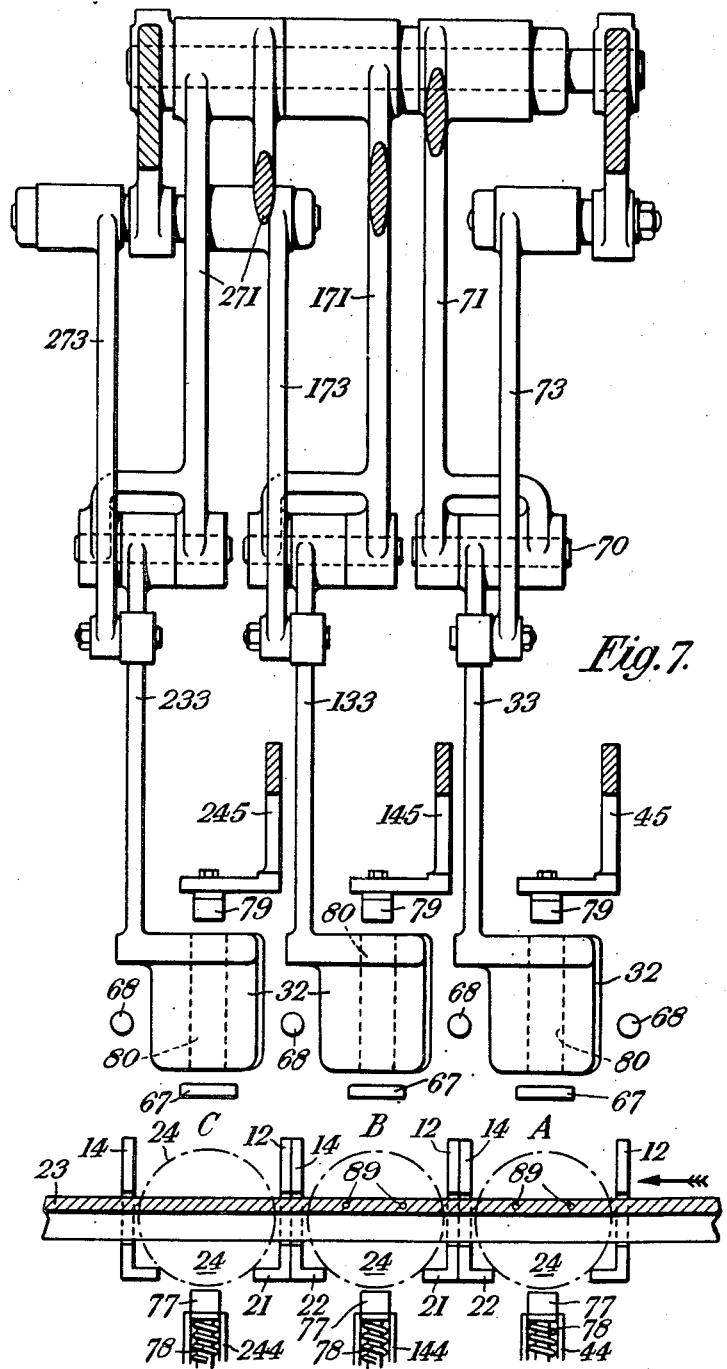

Patented July 13, 1954

2,683,520

UNITED STATES PATENT OFFICE 2,683,520

BISCUIT FEEDER

Alan Hopton and Alexander Russell, Leeds, England, assignors to The Forgrove Machinery Company Limited, Leeds, England, a company of Great Britain Application May 19, 1952, Serial No. 288,732

9 Claims. (Cl. 198—30)

In United States application Serial No. 219,016 now Patent No. 2,672,717 we have described a machine for wrapping loose biscuits, comprising an intermittently moving conveyor for feeding stacks of biscuits to the machine, the conveyor having a horizontal upper run and including a number of feed pockets, each having an opening at the bottom through which an elevator ascends to lift the stacks of biscuits in succession into a wrapping wheel.

Such a machine can be fed by hand, operators introducing the required numbers of biscuits into each feed pocket, but it is the object of this invention, in the interests of economy, to provide for automatic feeding of the required number of biscuits into the feed pockets from a magazine, into which biscuits may readily be charged in bulk from a conveyor leading from a baking oven. Difficulties arise, however, in providing such an automatic feed. The thickness of the biscuits varies from time to time in accordance with changes in the raw material supplied to and conditions within the baking oven, and we have found that, particularly in the case of thin biscuits, it is impossible, owing to these variations in thickness, to extract from a magazine in one operation the full number of biscuits required for a quarter pound or even a two ounce packet.

In the past, biscuits have been extracted singly from the top or bottom of multiple vertical magazines and stacked face to face in the feed pockets of a biscuit wrapping machine. Also biscuits have been extracted singly from a practically horizontal magazine, and automatically stacked face to face preparatory to being wrapped on a machine.

The present invention provides a method of charging with loose biscuits or the like feed pockets in an intermittently moving feed conveyor of a wrapping machine from multiple magazines, which comprises withdrawing mechanically and simultaneously from each magazine a batch of biscuits consisting of a limited number of biscuits less than that required to fill a feed pocket, the total number of biscuits in all the batches being equal to the number required to fill a feed pocket, and thereafter simultaneously mechanically depositing the batches of biscuits on edge, each in one of a number of consecutive feed pockets of the conveyor, the batches being deposited in the several feed pockets at points offset from one another so that each feed pocket receives, until it is full, a plurality of batches of biscuits (one during each of a number of consecutive machine cycles) which are deposited side by side in the feed pocket.

The invention includes, in combination with an intermittently moving feed conveyor of a wrapping machine, a plurality of magazines, means for extracting at each machine cycle a batch of loose biscuits or the like from each magazine (the total number of biscuits in all the batches taken together being that required to fill a feed pocket of the conveyor), means for thereafter transferring the batches into positions above successive feed pockets, each batch being brought to a position above a different feed pocket, and depositing the batches of biscuits on edge in said feed pockets, the positions to which the batches are transferred being such that the batches are deposited in succession side by side in the feed pockets to fill them.

Preferably the magazines are inclined to the horizontal at a small angle, e. g. 15°, and extend transversely to the direction of run of the conveyor, and the mechanism includes separators, one associated with each magazine, for lifting, at each machine cycle, batches of biscuits from the lower ends of the magazines, transfer levers for transferring the batches of biscuits from the separators to positions above the feed pockets and top and bottom plungers for depositing the stacks of biscuits in the feed pockets.

Figure 4:
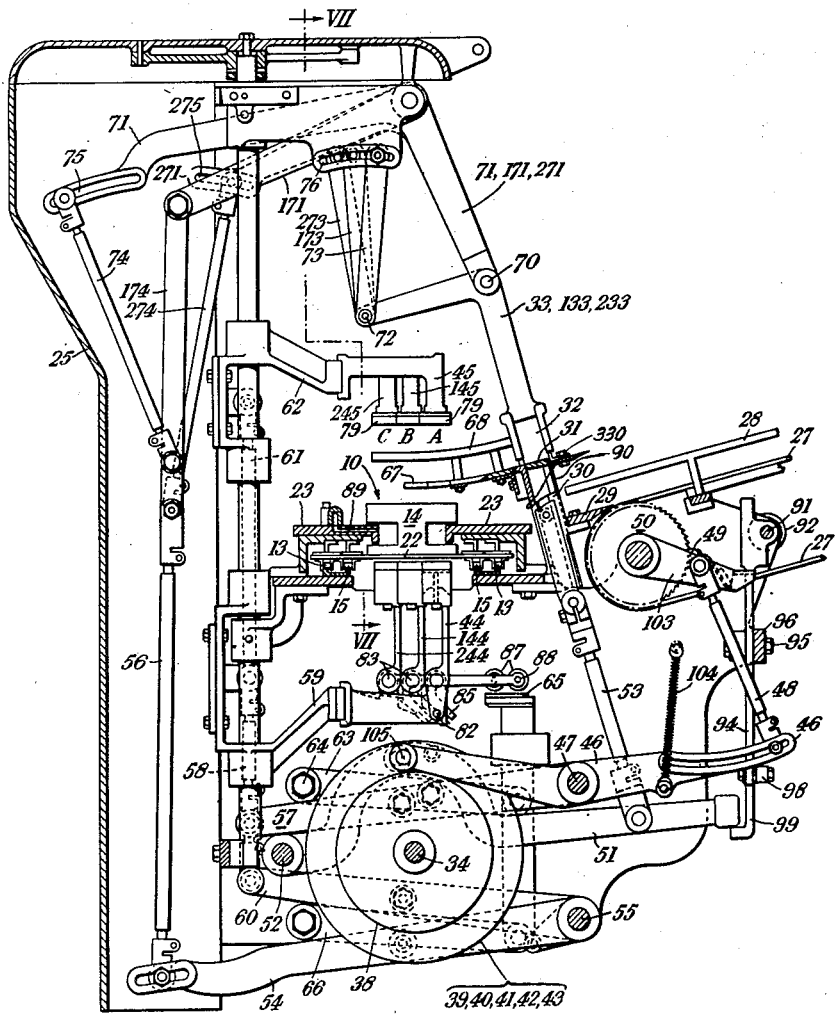
Figure 5:
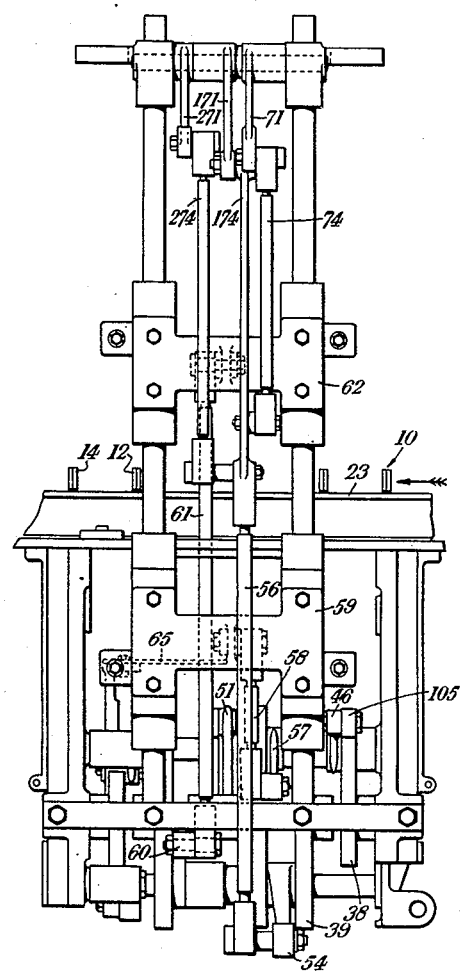
Figure 6:
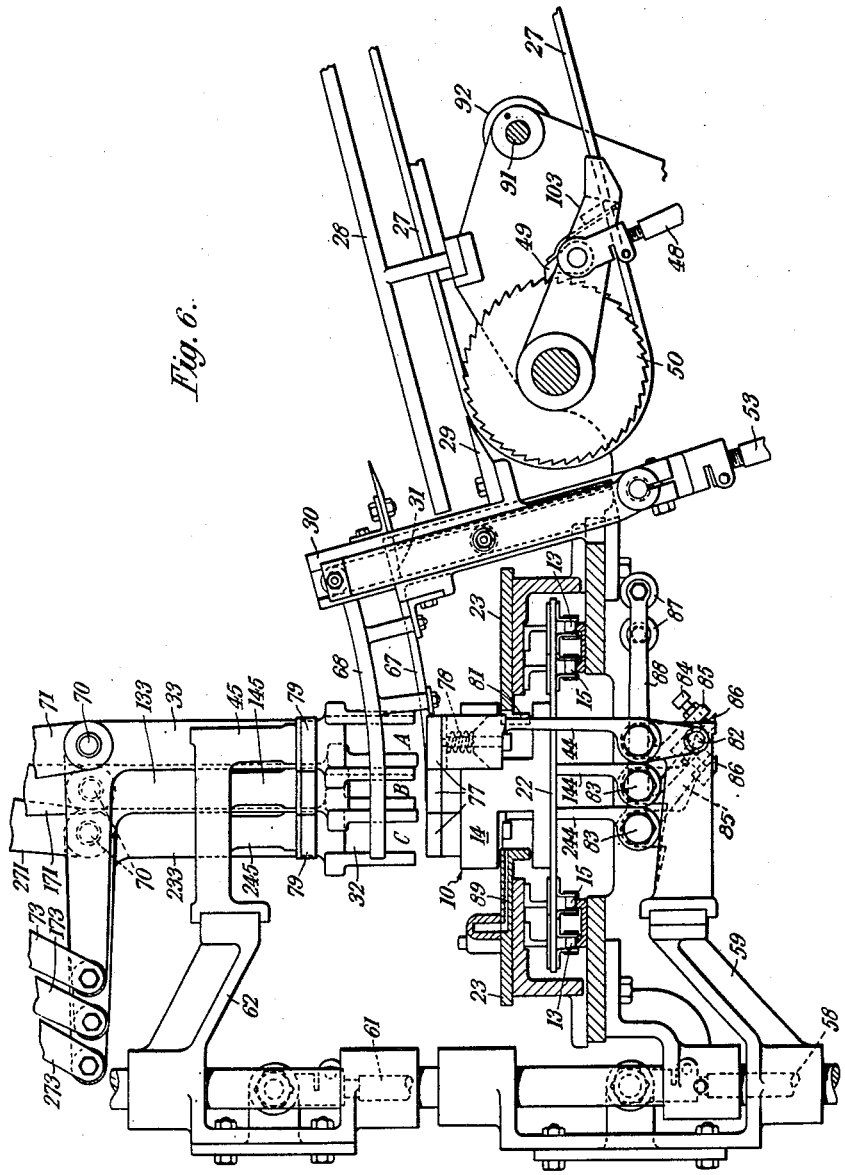

One specific embodiment of the invention will now be described in detail, by way of example, with reference to the accompanying drawings, in which:

Fig. 1 is a side elevation of the conveyor and associated biscuit feed mechanism, Fig. 2 is a section, on a larger scale, on the line II—II in Fig. 1, Fig. 3 is a section on the line III—III in Fig. 2, Fig. 4 is a section, on the same scale as Fig. 2, on the line IV—IV in Fig. 1, Fig. 5 is a view looking from the left hand side of Fig. 4, with the magazine cover and other parts omitted, Fig. 6 is a view, on a larger scale, of part of Fig. 4 showing the parts moved to a different position, and Fig. 7 is a section on the line VII—VII in Fig. 4.

Like reference numerals indicate like parts throughout the figures.

In the machine shown in the drawings, the automatic feed mechanism is organised for a packet containing nine biscuits, and there are three magazines and three sets of transfer mechanisms, the nine biscuits required to fill each feed pocket of the conveyor being made up of three batches, each containing three biscuits and supplied one from each magazine. It will be appreciated, however, that different batch numbers may be used, e. g. 3—2—3, 3—4—3, 4—3—4, 4—4—4 and so on. Also the number of magazines can be varied to suit different lengths of packet and different thicknesses of biscuit.

The machine includes a conveyor 10 which travels, in the direction indicated by the arrows in Figs. 1, 5 and 7, to feed the stacks of biscuits in succession from an automatic feed mechanism, indicated generally at 11 in Fig. 1, to a wrapping machine not shown. The conveyor and wrapping machine are fully described in United States application Serial No. 219,016 and it will be sufficient here to explain that each feed pocket of the conveyor comprises a pusher, constituted by an angle plate 12 extending between and attached to a pair of outer parallel chains 13 (see Figs. 4 and 6) and another angle plate 14 extending between and attached to a pair of inner parallel chains 15. For clarity the angle plates 12, 14 are shown on the top flight only of the conveyor 10 in Fig. 1. The chains 13, 15 pass around sets of driven sprockets 16 and guide sprockets 17, 18, 19. The sprockets 16 are intermittently rotated to impart intermittent movement to the conveyor and the sprockets 17, which are mounted on a pivoted lever 20, serve to tension the chains. The inturned flanges 21, 22 (Fig. 7) of the angle plates 12, 14 serve to support the biscuits but leave space between them to allow an elevator (not shown) to lift the stacks of biscuits from the feed pockets into a wrapping wheel. Side control plates 23 (Figs. 4 and 6) accommodated in transverse slots in the angle plates define the sides of the feed pockets. The biscuits 24 are, as shown in Fig. 7, placed on edge in the feed pockets with their lengthwise dimension extending parallel to the direction of travel of the conveyor 10.

Disposed opposite the casing 25 are disposed three biscuit magazines 26, 126, 226 (Fig. 3) which extend transversely to the conveyor 10 and are inclined at about 15° to the horizontal. Each magazine comprises a travelling belt 27 (Figs. 2 and 4) on which the biscuits 24 are placed on edge, the lengthwise direction of the biscuits extending transversely to the belt, and side rails 28 above the belts keep the biscuits under control without offering serious resistance to their forward feed by the belts. By substituting side rails 28 of different shape it is possible to cater for biscuits of different length. The belts 27 feed the biscuits forwardly and downwardly and over a dead plate 29 into channels in a fixed member 30 (Figs. 2, 4 and 6). Periodically a separator 31 rises in each channel, to the position shown in Fig. 4, to lift, from the associated magazine 26, 126, or 226 and into the pocket 32 of a transfer lever 33, 133 or 233 (Fig. 4) the three bottom biscuits of the procession therein. During the upward movement of the separators 31 the biscuits contained therein are supported against toppling by the rear walls 330 (Fig. 4), of the channels in the member 30. After the separators 31 have moved down into their bottom positions, the belts 27 are fed forward to move the next three biscuits in each magazine into position above the separators 31.

A cam shaft 34 (Fig. 4) is driven by bevel gearing 35 (Fig. 2) from a shaft 36 (Fig. 1) which, in turn, is driven by a chain drive 37 from a sprocket 9 driven by the wrapping mechanism. The cam shaft 34 carries six cams, viz.

(1) A cam 38 for imparting intermittent movement to the belts 27 through a pawl and ratchet gear.

(2) A cam 39 for imparting up and down movement to the three separators 31.

(3) A cam 40 for imparting rocking movement to the three transfer levers 33, 133, 233.

(4) A cam 41 for imparting up and down movement to three bottom plungers 44, 144, 244.

(5) A cam 42 for imparting up and down movement to three top plungers 45, 145, 245.

(6) A cam 43 for tilting two of the bottom plungers, viz. 144, 244.

The cam 38 actuates a lever 46 (Fig. 4) pivoted at 47 and coupled to a link 48 carrying a pawl 49 coacting with a ratchet 50 for imparting movement to the belts 27. The cam 39 actuates a lever 51, pivoted at 52 and coupled by a spindle 53 to the three separators 31. The cam 40 actuates a lever 54, pivoted at 55 and coupled by a link 56 to mechanism for actuating, as later described, the three transfer levers 33, 133, 233. The cam 41 actuates a lever 57, pivoted at 47 and coupled by a link 58 to a bracket 59 carrying the three bottom plungers 44, 144, 244. The cam 42 actuates a lever 60, pivoted at 55, and coupled by a link 61 to a bracket 62 carrying the three top plungers 45, 145, 245. The cam 43 actuates a lever 63, pivoted at 64 and carrying a member 65 which is constrained, by a lower link 66, to execute a substantially vertical movement under control of the cam 43.

The plungers 44, 144, 244 are disposed respectively below the right hand third, as seen from the rear (Fig. 4), of a trailing feed pocket of the conveyor 10, above the middle third of the next feed pocket of the conveyor and above the left hand third of the next or leading feed pocket of the conveyor. The plungers 45, 145, 245 are in vertical alignment with the plungers 44, 144, 244 respectively.

After the batches of biscuits have been lifted, as already described, into the pockets 32 of the transfer levers 33, 133, 233, these are given a rocking movement to traverse their respective batches of biscuits along plates 67 (Fig. 4) and between side guides 68 into position above three consecutive feed pockets of the conveyor 10. The transfer lever 33 shifts its batch to position A (Fig. 4) above the righthand third of the trailing feed pocket and between the plungers 44, 45, the transfer lever 133 shifts its batch to position B above the centre of the next feed pocket and between the plungers 144, 145 and the transfer lever 233 shifts its batch to position C above the left hand third of the leading feed pocket and between the plungers 244, 245. The batches of biscuits are thus moved by the transfer pockets 32 into positions such that the feed pockets can be filled by side-by-side deposition therein at successive machine cycles of three batches of biscuits, starting from the right hand side.

The necessary differential movements are imparted to the three transfer levers 33, 133, 233 from the link 56 as follows: The transfer levers are constituted by bell cranks and pivoted at 70 (Fig. 4) to bell cranks 71, 171, 271 respectively and at 72 to steady links 73, 173 and 273 respectively. The left hand arms, as seen in Fig. 4, of the bell cranks 71, 171, 271 are coupled respectively by links 74, 174, 274 to the link 56. Pin and slot connections 75, 275 between the bell cranks 71, 271 and their associated actuating linkages permit of variation in the stroke imparted to the transfer levers 33, 233, and pin and slot connections 76 permit of adjustment of the position of the steady links 73, 173, 273.

Each transfer pocket 32 is, of course, open at the bottom to allow the associated separator 31 to lift a batch of biscuits into it, and sweeps the biscuits off the separator 31, along the associated biscuit support plate 67 and between the side guide rails 68 and on to the top of the associated bottom plunger 44, 144 or 244. Each bottom plunger carries a sponge rubber pad 77 (Fig. 6) urged upwardly into contact with the bottom of the batch of biscuits by a compression spring 78. The bottom plungers rise through the three adjacent feed pockets in the conveyor into position level with the biscuit support plates 67, as shown in Fig. 6, immediately prior to arrival of the batches of biscuits at the ends of the support plates, and thereafter the three top plungers 45, 145, 245 descend on top of the batches of biscuits. The top plungers are also fitted with sponge rubber pads 79 to provide flexibility and avoid damage to the biscuits. Grooves 80 (Fig. 7) are provided in the transfer lever pockets 32 and a similar groove 81 (Fig. 6) is provided in one of the conveyor side control plates 23 to allow of the necessary up and down movements of the top and bottom plungers. The top plungers 45, 145, 245 are of L shape, as shown in Fig. 7, so that the transfer levers 33, 133, 233 can commence their return movement to the leading position immediately the top plungers have moved below the transfer pockets 32.

The bottom plunger 44 associated with the leading feed pocket is fixed to its support bracket 59 by a pin 82 (Fig. 6). The other bottom plungers 144, 244 are pivoted to the support bracket at 83, and are urged, by springs (not shown) so that screws 84 carried by extensions 85 of the bottom plungers abut against stop faces 86 on the support bracket to maintain said bottom plungers normally upright. Rollers 87 mounted on horizontal arms 88 attached to the bottom plungers 144, 244 coact with the member 65 actuated by the cam 43, and this member 65 is raised to tilt the bottom plungers 144, 244, as they enter their respective feed pockets in the conveyor, to the left as seen in Fig. 4 and therefore away from the biscuits already deposited therein. As the bottom plungers 144, 244 rise into their feed pockets the member 65 allows the springs to return them to the vertical position, as shown in Fig. 6, thereby enabling them to hold the biscuits already in the pockets clear of the batches of biscuits about to descend into the pockets.

While the lifting plungers 45, 145, 245 are clear of the partly filled conveyor feed pockets and during the time that the feed pockets are moving between successive filling stations, the biscuits therein are prevented from falling flat by air jets played against them from jets 89 in the left hand side control plate 23.

The separators 31 are mounted on a spindle 53 which is moved up and down, as already described, by the rocking lever 51 actuated by the cam 39. The spindle 53 carries members which slide up and down on the opposite faces of the channelled member 30, but the separators 31 do not touch the walls of the channels in which they move. This ensures that crumbs from the biscuits may fall down the channels and into collecting trays (not shown). The front face 90 of each separator is flat and smooth, to avoid damaging the biscuits in the magazines as the separators move up and down. The distance from the forward biscuits in the magazines to the wall of the channelled member 30, towards which the biscuits are urged by the magazine belts 27, is never sufficient to allow the leading biscuits to fall to such an angle as to interfere with the biscuits feeding forward into the channels.

To facilitate initial loading of the magazines, but mainly to interrupt the flow of biscuits from the magazines, in order to allow the wrapping machine to be cleared of biscuits already in the feed pockets, a manually operated biscuit feed strip is provided. This strip prevents movement of both the magazine belts 27 and the separators 31. A rod 91 (Fig. 3) extending transversely of the magazine carries at its ends knobs 92 by which it may be shifted from one end position to another.

A spring 93 coiled around the rod 91, tends to rock an intercepting lever 94, pivoted at 95 to a member 96 of the machine frame, anticlockwise as seen in Fig. 3. When, however, the rod 91 is in the position shown in Fig. 3 a collar 97 thereon prevents such movement of the intercepting lever 94. The lever 94 is connected, by a link 98, to another intercepting lever 99 pivoted at 100 to the member 96.

When the rod 91 is pushed to the left in Fig. 3, the lever 94 is freed for anticlockwise movement and is rocked by the spring 93 into a position in which a knife edge 101 thereon is brought into position above a knife edge 102 on a member 103 carrying the pawl 49. Consequently a spring 104 (Fig. 4) is prevented from imparting a feed stroke to the pawl 49 when the follower 105 on the lever 46 encounters a low portion of the cam 38. At the same time the lever 99 is rocked anticlockwise, as seen in Fig. 3, to bring a knife edge 106 thereon below a knife edge 107 on the lever 51, thereby preventing the separators 31 from moving down from their top position. Movement of the rod 91 to the right, as seen in Fig. 3, renders these trip members inoperative and permits of actuation of the belts 27 and separators 31.

The magazines must contain sufficient biscuits to ensure that they will be urged over the dead plate 29 and into the channels of the channelled member 30. The length of the tops of the separators 31 is such as to allow for the maximum variation in biscuit thickness and lifting of the required number of biscuits from the magazines.

To get the working sequence of loading sections of the aggregate number of biscuits into the wrapping machine feed pockets when starting the automatic biscuit feed a thin bladed shutter (not shown) is manually moved forward between the biscuits in the magazines 126 and 226 and the front of the channelled member 30. The wrapping machine and the automatic biscuit feed mechanism are "inched" round one revolution to deposit the first batch of biscuits into a conveyor feed pocket. The shutter is then moved back to uncover the magazine 126, the two combined machines are again "inched" round one revolution to deposit the second batch of biscuits into the feed pocket containing the first batch of biscuits. After this the shutter can be moved right back to the shutter stop and the machines started up to feed the full complement of biscuits into each feed pocket.

What we claim as our invention and desire to secure by Letters Patent is:

1. The combination, with an intermittently moving conveyor having therein a plurality of spaced feed pockets, of a plurality of magazines for delivering loose biscuits or the like to said conveyor, and feed mechanism for charging said feed pockets at different stations with successive batches of loose biscuits until said feed pockets are filled, said feed mechanism comprising separators operating in timed relationship with the conveyor for periodically extracting batches of biscuits from said magazines, the total number of biscuits in all of said batches being that required to fill a feed pocket of said conveyor, transfer mechanism cooperating with said separators for thereafter transferring said batches simultaneously to stations above successive feed pockets of said conveyor, said stations being spaced laterally from one another in relation to the conveyor, and means coacting with said transfer mechanism for thereafter depositing said batches of biscuits on edge in said feed pockets.

2. The combination, with an intermittently moving conveyor having therein a plurality of spaced feed pockets, of a plurality of magazines for delivering loose biscuits or the like to said conveyor and feed mechanism for charging said feed pockets at different stations with successive batches of loose biscuits until said feed pockets are filled, said feed mechanism comprising separators operating in timed relationship with the conveyor for periodically extracting batches of biscuits from said magazines, the total number of biscuits in all of said batches being that required to fill a feed pocket of said conveyor, a plurality of transfer levers cooperating each with one of said separators to transfer the batches of biscuits to stations above successive feed pockets of said conveyor, said stations being spaced laterally from one another in relation to the conveyor, and top and bottom plungers associated with each transfer lever for depositing the batches of biscuits on edge in said feed pockets.

3. The combination, with an intermittently moving conveyor having therein a plurality of spaced feed pockets, of a plurality of magazines for delivering loose biscuits or the like to said conveyor, said magazines being inclined to the horizontal at a small angle and extending transversely to the direction of run of the conveyor, and feed mechanism for charging said feed pockets at different stations with successive batches of loose biscuits until said feed pockets are filled, said feed mechanism comprising separators operating in timed relationship with the conveyor for periodically lifting batches of biscuits from the lower ends of said magazines, the total number of biscuits in all of said batches being that required to fill a feed pocket of said conveyor, transfer mechanism cooperating with said separators for thereafter transferring said batches simultaneously to stations above successive feed pockets of said conveyor, said stations being spaced laterally from one another in relation to the conveyor, and means coacting with said transfer mechanism for thereafter depositing said batches of biscuits on edge in said feed pockets.

4. The combination, with an intermittently moving conveyor having therein a plurality of spaced feed pockets, of a plurality of magazines for delivering loose biscuits or the like to said conveyor and feed mechanism for charging said feed pockets at different stations with successive batches of loose biscuits until said feed pockets are filled, said feed mechanism comprising separators operating in timed relationship with the conveyor for periodically extracting batches of biscuits from said magazines, the total number of biscuits in all of said batches being that required to fill a feed pocket of said conveyor, a plurality of transfer levers cooperating each with one of said separators, all of said transfer levers being mounted to rotate about a common axis, a cam common to all of said transfer levers, differential linkages for imparting to said transfer levers from said cam arcuate movements of different extent to transfer said batches to stations above successive feed pockets of said conveyor, said stations being spaced laterally from one another in relation to the conveyor, and means coacting with said transfer mechanism for thereafter depositing said batches of biscuits on edge in said feed pockets.

5. The combination, with an intermittently moving conveyor having therein a plurality of spaced feed pockets, of a plurality of magazines for delivering loose biscuits or the like to said conveyor and feed mechanism for charging said feed pockets at different stations with successive batches of loose biscuits until said feed pockets are filled, said feed mechanism comprising separators operating in timed relationship with the conveyor for periodically extracting batches of biscuits from said magazines, the total number of biscuits in all of said batches being that required to fill a feed pocket of said conveyor, a plurality of transfer levers cooperating each with one of said separators, all of said transfer levers being mounted to rotate about a common axis and each of said transfer levers having a transfer pocket, open at the bottom into which batches of biscuits are lifted in succession by the associated separator, a biscuit support plate associated with each transfer lever, a cam common to all of said transfer levers, differential linkages for imparting to said transfer levers from said cam arcuate movements of different extent along said support plates to transfer said batches to stations above successive feed pockets of said conveyor, said stations being spaced laterally from one another in relation to the conveyor, and means coacting with said transfer mechanism for thereafter depositing said batches of biscuits on edge in said feed pockets.

6. The combination, with an intermittently moving conveyor having therein a plurality of spaced feed pockets, of a plurality of magazines for delivering loose biscuits or the like to said conveyor and feed mechanism for charging said feed pockets at different stations with successive batches of loose biscuits until said feed pockets are filled, said feed mechanism comprising separators operating in timed relationship with the conveyor for periodically extracting batches of biscuits from said magazines, the total number of biscuits in all of said batches being that required to fill a feed pocket of said conveyor, a plurality of transfer levers cooperating each with one of said separators to transfer the batches of biscuits to stations above successive feed pockets of said conveyor, said stations being spaced laterally from one another in relation to the conveyor, top and bottom plungers associated with each transfer lever for depositing the batches of biscuits on edge in said feed pockets, a bracket supporting the bottom plungers, the bottom plunger associated with the leading feed pocket being fixed to the bracket and projecting vertically therefrom and each of the other bottom plungers being pivoted to the bracket, a cam for imparting vertical movement to the bracket to lift the bottom plungers into position to receive the biscuits from the transfer levers, means constraining each of the other bottom plungers to project vertically from the bracket and a cam operated member for tilting each of said other bottom plungers in relation to the bracket, as it enters a feed pocket in the conveyor, in a direction away from the biscuits previously deposited in the feed pocket.

7. The combination of an intermittently moving chain conveyor comprising angle plates, extending transversely to the chains and defining the front and rear ends of feed pockets in said conveyor and stationary guide plates defining the sides of said feed pockets, a plurality of magazines for delivering loose biscuits or the like to said conveyor, and feed mechanism for charging said feed pockets at different stations with successive batches of loose biscuits until said feed pockets are filled, said feed mechanism comprising separators operating in timed relationship with the conveyor for periodically extracting batches of biscuits from said magazines, the total number of biscuits in all of said batches being that required to fill a feed pocket of said conveyor, transfer mechanism cooperating with said separators for thereafter transferring said batches simultaneously to stations above successive feed pockets of said conveyor, said stations being spaced laterally from one another in relation to the conveyor, means coacting with said transfer mechanism for thereafter depositing said batches of biscuits on edge in said feed pockets, and nozzles in one for said guide plates for directing into each feed pocket containing but a partial charge of biscuits a blast of air to support the biscuits against falling.

8. The combination, with an intermittently moving conveyor having therein a plurality of spaced feed pockets, of a plurality of magazines for delivering loose biscuits or the like to said conveyor, each of said magazines comprising a belt conveyor for supporting the biscuits therein, and feed mechanism for charging said feed pockets at different stations with successive batches of loose biscuits unitl said feed pockets are filled, said feed mechanism comprising separators operating in timed relationship with the conveyor for periodically extracting batches of biscuits from said magazines, the total number of biscuits in all of said batches being that required to fill a feed pocket of said conveyor, cam operated mechanism for imparting intermittent forward movement to said belt conveyors in timed relation with the movement of said separators, transfer mechanism cooperating with said separators for thereafter transferring said batches simultaneously to stations above successive feed pockets of said conveyor, said stations being spaced laterally from one another in relation to the conveyor, and means coacting with said transfer mechanism for thereafter depositing said batches of biscuits on edge in said feed pockets.

9. The combination, with an intermittently moving conveyor having therein a plurality of spaced feed pockets, of a plurality of magazines for delivering loose biscuits or the like to said conveyor, each of said magazines comprising a belt conveyor for supporting the biscuits therein, feed mechanism for charging said feed pockets at different stations with successive batches of loose biscuits until said feed pockets are filled, said feed mechanism comprising separators, one allotted to each magazine, mechanism for reciprocating said separators upwardly and downwardly in timed relation with the conveyor to periodically lift batches of biscuits from said magazines, the total number of biscuits in all of said batches being that required to fill a feed pocket of said conveyor, cam operated mechanism for imparting intermittent forward movement to said belt conveyors in timed relation with the movement of said separators, transfer mechanism cooperating with said separators for thereafter transferring said batches simultaneously to stations above successive feed pockets of said conveyor, said stations being spaced laterally from one another in relation to the conveyor, and means coacting with said transfer mechanism for thereafter depositing said batches of biscuits on edge in said feed pockets, trip members for disabling the mechanism for moving the belt conveyors and the mechanism for reciprocating the separators, and manually operable means for moving the trip members together from operative to inoperative position, the trip member associated with the separators being effective, when operative, to retain the separators in their top position.

References Cited in the file of this patent

UNITED STATES PATENTS

| Number | Name | Date |
|---|---|---|
| 2,092,916 | Hildebrand | Sept. 14, 1937 |
| 2,408,838 | Wilckens | Oct. 8, 1946 |
| 2,614,679 | Sandberg | Oct. 21, 1952 |